United States Patent [19]
Jacobs

[11] 3,908,722
[45] Sept. 30, 1975

[54] GOLF CLUB HEAD FACING APPARATUS

[76] Inventor: William H. Jacobs, 510 Reynolds Ave., Akron, Ohio 44313

[22] Filed: Apr. 30, 1974

[21] Appl. No.: 465,522

[52] U.S. Cl. .......... 144/2 XA; 83/411 R; 144/134 R; 144/150; 144/321
[51] Int. Cl.² ... B27M 3/00; B27M 3/22; B27C 5/06
[58] Field of Search ..... 144/2 XA, 2 R, 118, 134 R, 144/134 E, 134 F, 150, 137, 321; 83/409, 410, 411 R, 415, 732, 733

[56] References Cited
UNITED STATES PATENTS
2,767,749  10/1956  Brandon........................... 144/134 R
FOREIGN PATENTS OR APPLICATIONS
494,123  6/1953  Canada........................... 144/134 F

*Primary Examiner*—D. R. Schran
*Assistant Examiner*—W. D. Bray
*Attorney, Agent, or Firm*—Hamilton, Renner & Kenner

[57] ABSTRACT

Apparatus for precision machining spherical faces of various radii and angles of loft or inclination on the hitting face of so-called wood golf clubs. The club head is adjustably mounted as to loft on a radius arm of adjustable radius with the club face centered relative to the axis of a rotatable milling cutter having at least one radially offset bit, and the arm is swung on the selected radius to cause the club face to traverse the cutter and generate a spherical milled surface on the face.

8 Claims, 7 Drawing Figures

3,908,722

GOLF CLUB HEAD FACING APPARATUS

BACKGROUND OF THE INVENTION

In the conventional manufacture of wood clubs the hitting face of the club head is usually given its desired convexity by time-consuming incremental hand sanding operations to approximate the desired convexly curved surface and loft, with consequent inaccuracies. These operations are further complicated by the presence in the face of a wedge-shaped convex metal or plastic insert which may be held in place by four screws, the surface of the insert and screw heads being required to be in accurate conformity with the surface of the wood face. It is highly desirable that the face be spherical in contour overall because of the spin imparted to the ball when struck and it has been proposed to accomplish this by two separate milling operations using contour cutters in planes at right angles to each other, which increases cutting pressure as well as cost, and adds further inaccuracies, and any desired change in contour requires different cutters and coordinated retooling.

U.S. Pat. No. 1,675,437 discloses a machine for facing the head of a wood golf club with the head clamped in a predetermined position intended to relate to the club shaft when flexed by the swing of a player at the moment of impact with a golf ball. In this position of the head a flat faced milling cutter is swung on a fixed radius across the face to produce a convex surface in one plane or direction only, and there is no provision for adjusting the radius of that surface.

SUMMARY OF THE INVENTION

It is an object of the present invention to provide an improved apparatus for precision machining a spherical surface on the hitting face of wood golf clubs of varying heights and angularity.

Another object is to provide improved means for adjusting the angle of loft of the club head face.

Another object is to provide improved means for varying the radius of the spherical surface of the club head face.

A further object is to provide improved means for milling a spherical surface on the club head face during relative swinging movement of the club head in one plane.

Another object is to provide improved means for swinging a golf club head on an adjustable radius arm and improved angularly adjustable head holding means mounted on said radius arm.

A further object is to provide improved apparatus for forming an accurate spherical overall surface on the face of a wood golf club having an insert, regardless of the increased hardness of the insert and screws attaching the same.

A still further object is to provide improved means for holding the club head in adjusted positions of varying angles to the line of flight of a ball struck by the face, so as to provide a so-called "closed" or "open" faced club.

BRIEF DESCRIPTION OF THE DRAWINGS

FIG. 3 is a partial sectional view as on line 3—3 of FIG. 1.

DESCRIPTION OF A PREFERRED EMBODIMENT

Figure 1:
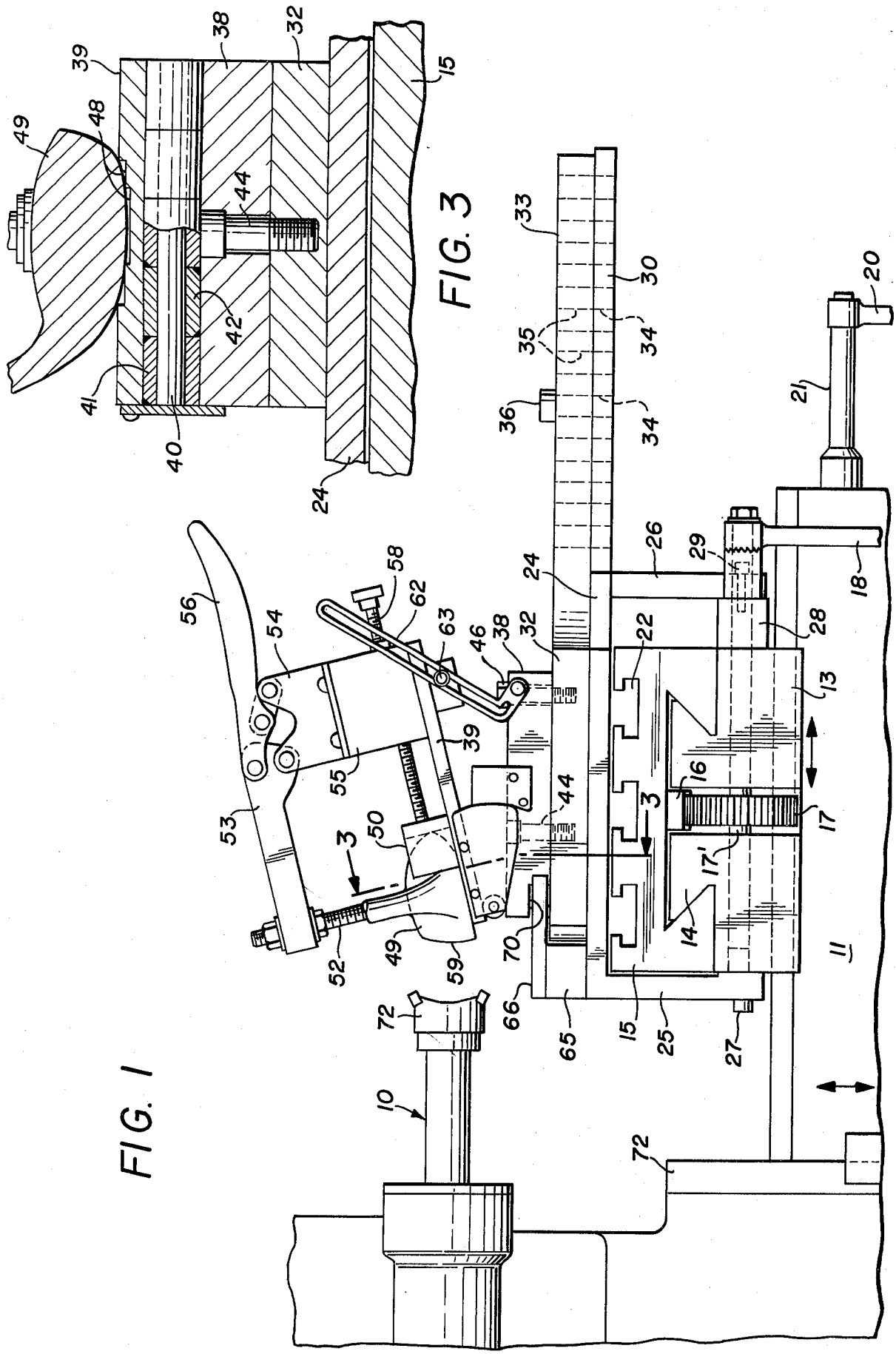
FIG. 1 is a side elevational view of a preferred embodiment of the improved apparatus as mounted on a conventional knee type hand milling machine shown fragmentarily in the figure, a wood golf club head being held in the apparatus with its face centered on the axis of the cutting tool spindle.

The improved wood golf club head facing apparatus is adapted to be mounted on a conventional knee type hand milling machine, as shown and described herein, but the apparatus may be applied to or embodied in different or modified types of milling machines, including machines having fluid driven feeds with automatic cycles for high production. The term "wood" golf club is intended to mean golf clubs of the so-called wood type or design in which the head may be made of wood or other suitable material, such as metal or plastic.

The knee type milling machine shown in the drawings has a horizontal motor-driven tool spindle 10, a knee support 11 vertically movable on a frame 12, a cross saddle 13 mounted on the knee support 11 and having a dovetail slide 14, and a horizontal table 15 mounted on the slide for movement transversely of the knee and of the axis of the spindle 10. The table has a usual rack 16 on its underside which is engaged by a pinion 17 on a rotatable shaft 17' in the saddle for moving the table 15 on the slide 14. An operating handle 18 is secured on the outer end of shaft 17'. Another operating handle 20 is secured on a shaft 21 rotatably mounted in the knee support for moving the saddle 13 and table 15 toward and away from the spindle 10 by suitable and well known gearing (not shown). Conventional and well known gearing means (not shown) are provided for raising and lowering the knee support 11 on the frame 12. The table 15 has the usual T-shaped longitudinal grooves 22 in its upper side for mounting attachments thereon.

The improved facing apparatus preferably comprises a bridge having an inverted U-shape with an upper support plate 24 and depending legs 25 and 26 straddling and secured to the saddle 13. As shown in FIG. 1, the leg 25 is secured to the inner surface of the saddle by studs 27, and the leg 26 is secured to a boss 28 on the outer surface by studs 29. The support plate 24 has a horizontal co-planar arm 30 extending outwardly from the bridge.

A horizontal radius plate 32 is slidably supported on the upper surface of plate 24 and has an outwardly extending radius arm 33 of reduced width bearing on the upper surface of support arm 30. A linear series of vertical holes 34 in arm 30 is located in a vertical plane passing through the axis of spindle 10, and a linear series of equally spaced vertical holes 35 in arm 33 registers with holes 34 when the arms 30 and 33 are in alignment, as indicated in full lines in FIG. 2. In this position a pivot pin 36 can be inserted in any pair of the registering holes 34 and 35 to vary or adjust the swinging radius of the arm 33 on arm 30. Indicia may be applied on plate 33 opposite the holes 35 showing the various lengths of radius arms represented thereby, and these may vary from 10 to 17 inches, for example.

Projecting from one side of radius plate 32 near its inner edge is an ear 32' to which one end of a link 37 is pivoted. The other end of the link is pivoted to an attachment connector 37' secured in one of the grooves 22 in the table 15. Thus, reciprocating movement of the table will cause the radius plate 24 and its arm 30 to swing about pivot 36 as a center.

Figure 4:
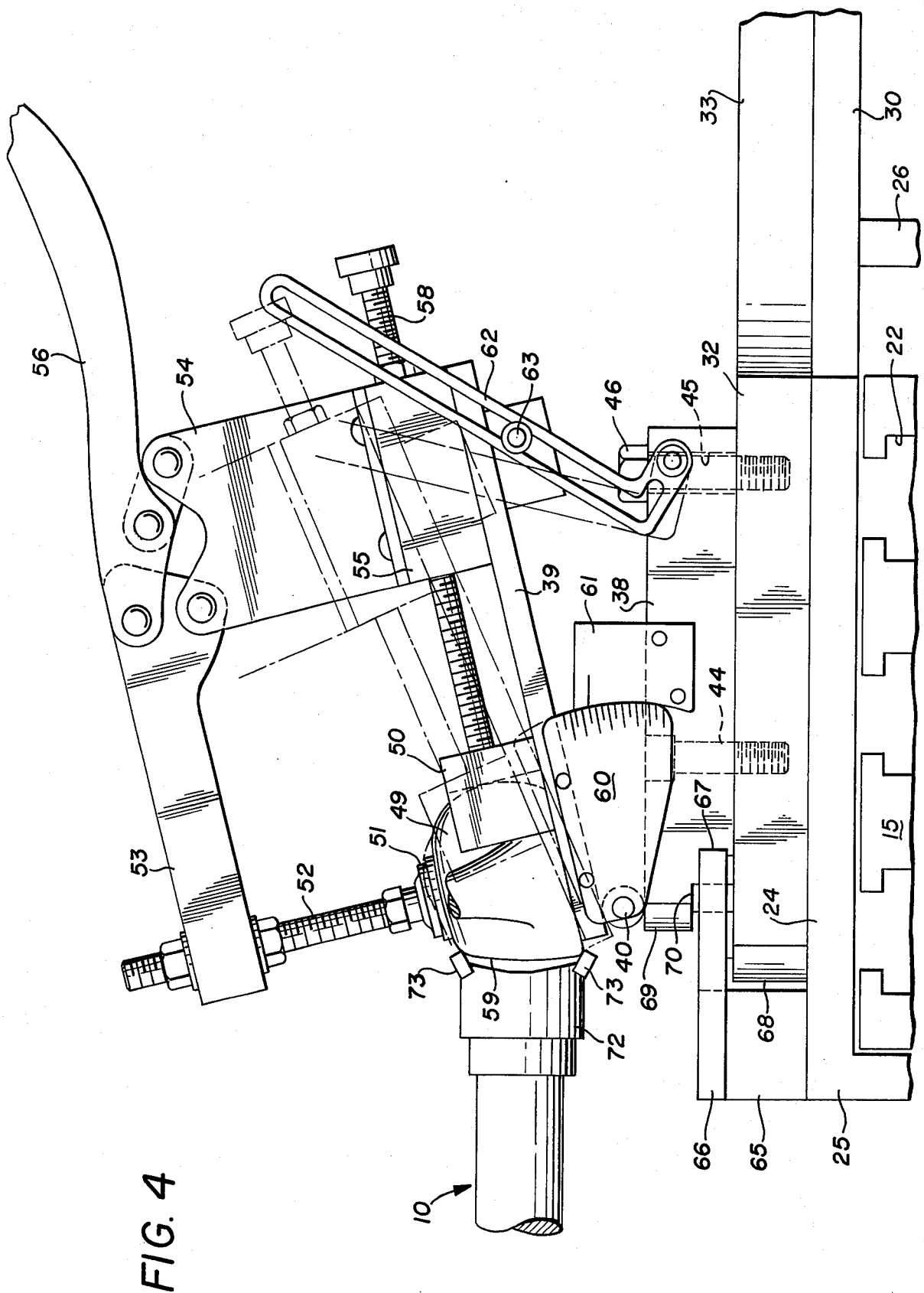
FIG. 4 is an enlarged fragmentary view similar to FIG. 1, showing an adjusted position of the golf head holding means in phantom lines.
Figure 5:
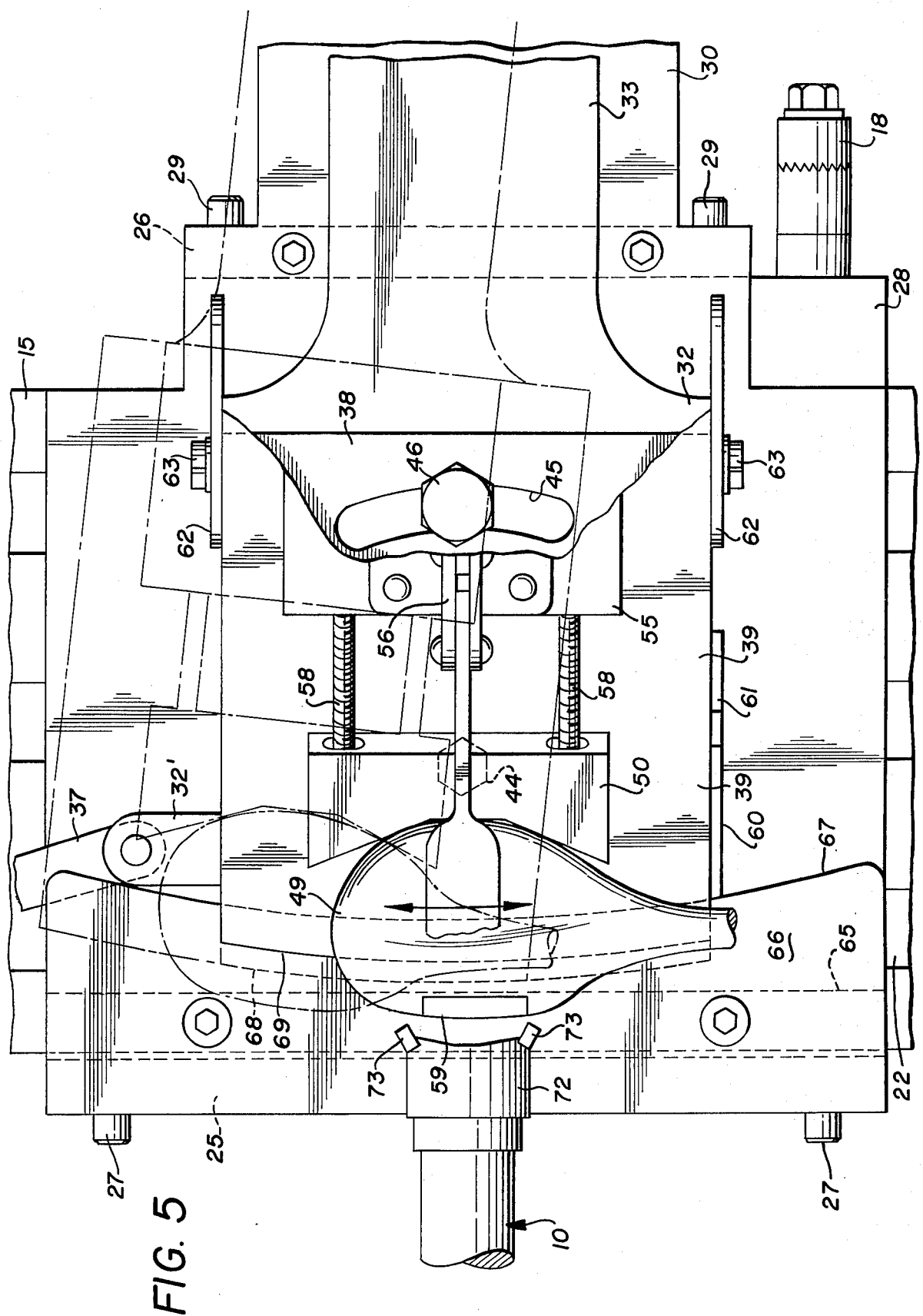
FIG. 5 is an enlarged fragmentary plan view similar to FIG. 2, with parts broken away.

The holding means for supporting and clamping a club head or a club head blank comprises a horizontal support plate 38 secured on top of radius plate 32. An angle plate 39 is pivoted for vertical swinging to the top of the inner end of plate 38 by a horizontal hinge pin 40 journaled in hinge leaves 41 and 42 extending alternately from the two plates. As shown in FIGS. 4 and 5, the plate 38 is pivotally secured for horizontal swinging on top of plate 32 by a screw stud 44 and has an arcuate slot 45 near its outer edge through which a clamping screw 46 secured in plate 32 extends. This arrangement provides for horizontally adjusting the angle of the club head face with respect to the spindle axis as will be hereinafter described.

The top inner surface of plate 39 is preferably provided with a stepped surface, as indicated, at 48 in FIG. 3, for engaging the bottom or sole of the club head 49 and aiding in preventing rotation of the head when the face is being milled. A chucking block 50 is adjustably mounted on the plate 39 and has a concave inner surface for abutting the convexly curved rear surface of the club head, and a contoured clamping shoe 51 for abutting the top surface is swiveled on the end of a clamping bolt 52. The clamping bolt 52 is adjustably mounted in a toggle arm 53 pivoted on a bracket 54 secured on a mounting block 55 on the outer top portion of angle plate 39, and a toggle handle 56 is pivotally connected to the bracket 54 and the toggle arm 53 for swinging the clamping bolt 52 and holding the shoe in head clamping position as shown in FIGS. 1 and 4 in a well known manner.

The means for adjustably mounting the chucking block on plate 39 preferably comprises two adjusting screws 58 threaded through mounting block 55 and swivel mounted in chucking block 50. The angle of loft of the face 59 of the club head is adjusted by swinging the angle plate 39 about its hinge pin 40 to various angles corresponding to those required by the various numbered wood clubs starting with a "No. 1" wood which usually has a loft angle of 10° to the vertical, and increasing the angle by 2½° increments for successively higher numbers. For this purpose a vernier scale 60 is attached to one edge of plate 39 for cooperating with a reference line on a plate 61 fixed on the side of plate 38, and scale 60 may have its graduations marked to indicate the angular positions of plate 39 corresponding to the loft angles of the various numbered wood clubs. Slotted clamping arms 62 pivoted on the side edges of plate 38 slidably receive clamping screws 63 secured in a block 64 on the underside of plate 39 for clamping the plate in adjusted position.

On the inner top portion of bridge plate 24 a spacer block 65 is mounted and a hold-down plate 66 is secured to the top of the block with its outer edge portion overlapping the adjacent inner edge portion of plate 32 to maintain it in contact with bridge plate 24. Preferably, the outer edge 67 of plate 66 is curved to substantially conform to the curve of inner edge 68 of radius plate 32 and of the outer edge 69 of support plate 38, and the outer edge portion 67 is received in an arcuate slot 70 in support plate 38 to allow horizontal swinging of the support plate 38 with the radius plate 32.

The milling cutter head 72 mounted on the end of spindle 10 of conventional construction having means for holding one or more cutting bits 73 radially offset from the axis of the spindle, the bits being angled to present a cutting edge so that rotation of the spindle will generate a circular cutting line. The face of the cutting head is concave to clear the convex face of the club head as it is swung horizontally across the face of the cutter. The radial distance between the two cutting bits 73 shown is calculated to be slightly greater than the face depth of the deepest faced club which is to be milled.

In the operation of the improved apparatus a club head blank 49 is clamped in position on the stepped portion 48 of angle plate 39 and the chucking block brought into abutment against the rear surface of the head with the radius arm 33 aligned with the spindle axis and the face of the head at right angles thereto. The face of the head is then centered vertically with the spindle axis by raising or lowering the knee 11. Next, the angle of loft desired is adjusted by adjusting the vertical angle of plate 39 as previously described. The saddle 13 is then moved on the knee 11 toward the spindle to a position which will produce the desired depth of cut on the face 59 of the club head.

Figure 2:
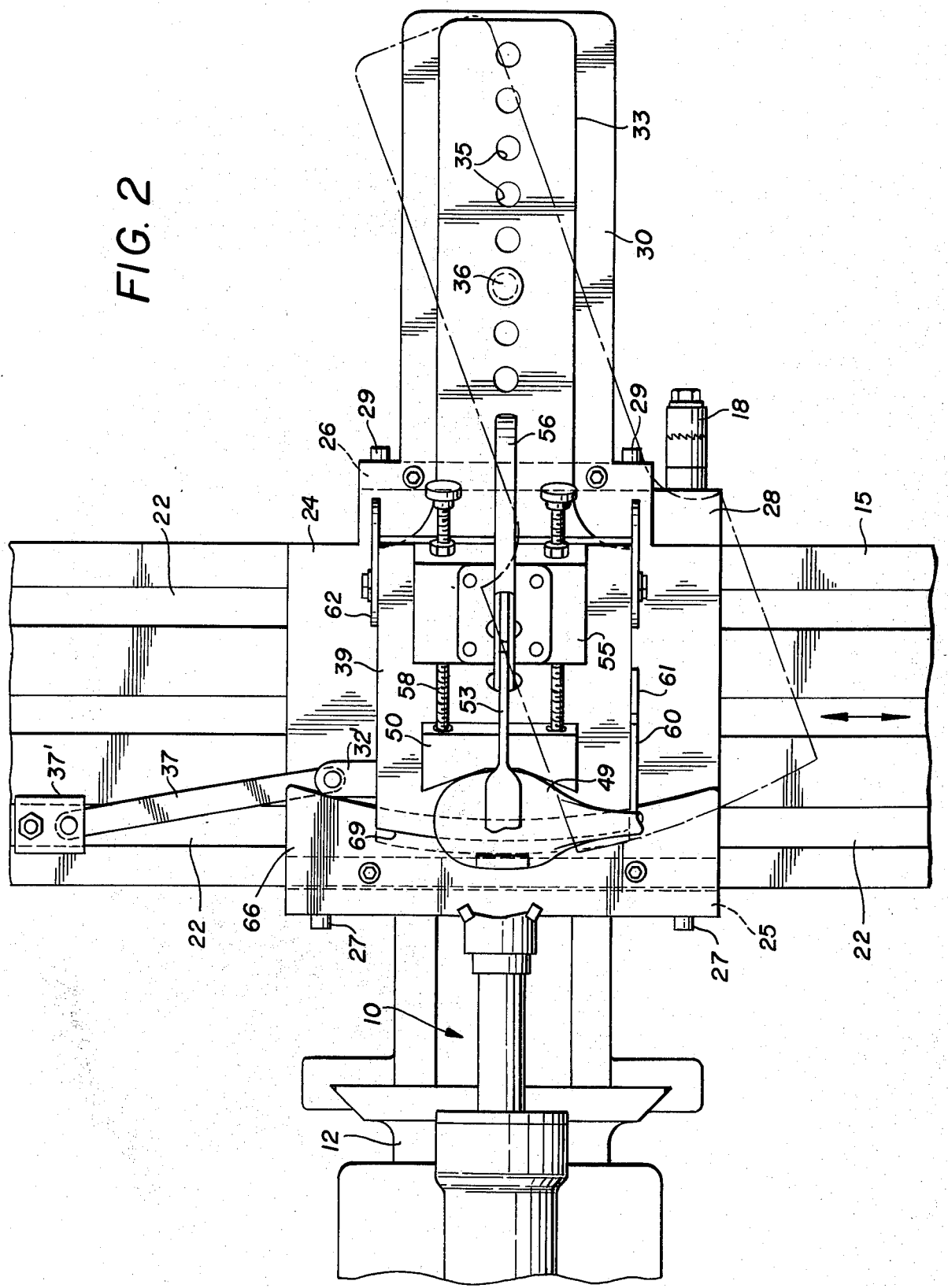
FIG. 2 is a plan elevational view thereof.

Now, with the radius plate swung to the phantom position shown in FIG. 2, the spindle 10 is rotated and the handle 18 is manually operated to move the table 15 in a horizontal plane at right angles to the spindle, whereupon the link 37 swings the radius arm 32 about the pivot 36, causing the club head face to traverse the cutting bits 73. Since the cutting bits describe a circular line, a spherical surface will be generated on the club head face, even though the club head is swung in one plane only, and the radius of the spherical surface is measured from the pivot 36. Moreover, the usual plastic or metal insert may be secured in place in the club head blank before facing as the rotating bits will generate a true spherical surface over the insert and its attaching screws as well as the wood part of the face, and since the bits are making a circular line cut the cutting pressure is minimized.

Figure 6:
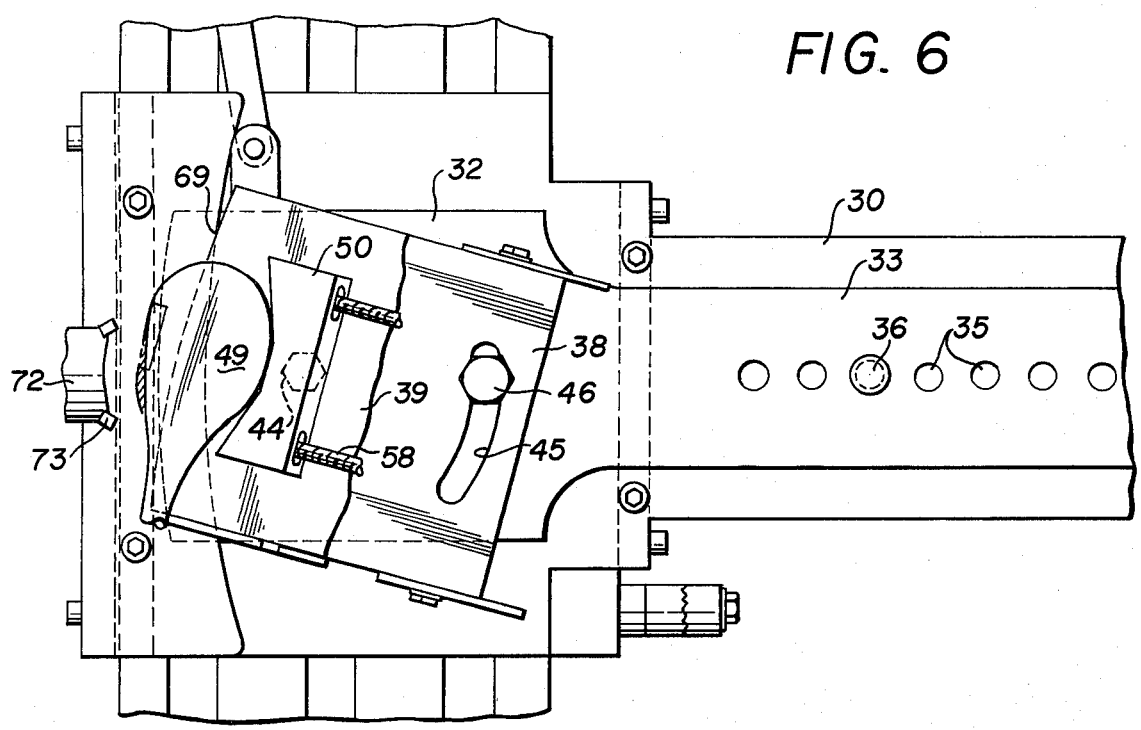
FIGS. 6 and 7 are schematic fragmentary plan views showing adjusted positions of the club head holding means to form closed and open faces, respectively, on the club head.
Figure 7:
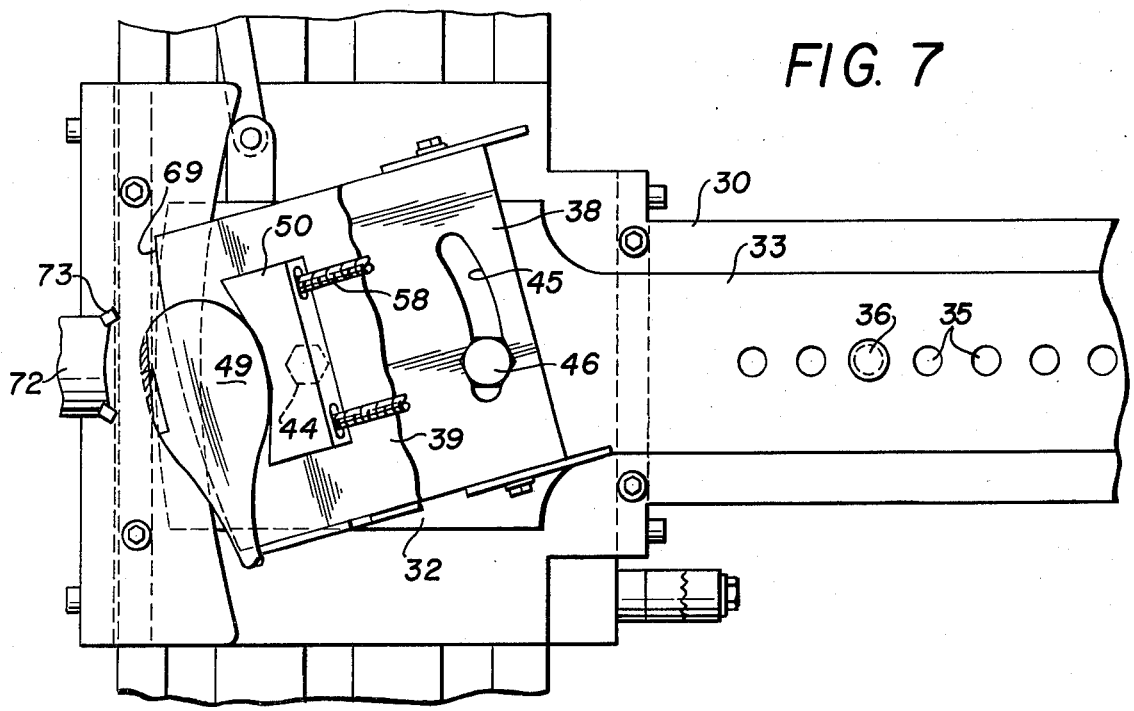

As indicated schematically in FIGS. 6 and 7, if a closed or open face, with respect to the line of flight of the ball, is desired on the club head, the head is first clamped in alignment with the spindle 10 as previously described, and then the support plate 38 is rotated on the pivot 44 by loosening clamping screw 46. FIG. 6 shows the plate 38 rotated clockwise to produce a closed face spherical surface, and FIG. 7 shows the plate 38 rotated counterclockwise to produce an open face spherical surface. Preferably, a vernier scale (not shown) is provided on plate 38 to show the angle of adjustment which should not exceed about 4°. The deviation of the spherical cuts generated by the club head positions of FIGS. 6 and 7 is shown somewhat exaggerated by the cross-hatched portions on the face.

It will be apparent that an improved apparatus is provided for precision machining spherical faces of various radii, depths and angles of loft on wood golf club heads, as well as aligned, closed or open faces. The apparatus is equally well adapted for facing right handed and left handed clubs, and may be used for club heads with the shafts already attached. Consequently, the faces of existing clubs can be reworked to produce more accurate aligned or closed or open faces.

I claim:

1. Apparatus for forming a spherical surface on the hitting face of a wood golf club comprising, a fixed support plate, a radius arm having a pivot on said plate for arcuately swinging its free end about said pivot in the plane of said plate, means fixedly mounted on the free end of said arm for holding a wood golf club head having a hitting face thereon in upright position, means for swinging the radius arm on its pivot, and rotatable cutter means axially perpendicular to the hitting face of said head when the radius arm and cutter means are aligned, said cutter means bodily axially movable into contact with the hitting face and having at least one radially offset outwardly projecting bit adapted for defining a circular cutting line resulting in a generated spherical surface on the club hitting face as the radius arm swings the head across the cutter.

2. Apparatus as defined in claim 1, having means for adjusting the swinging radius of said radius arm by adjusting the location of its pivot on the support plate.

3. Apparatus as defined in claim 1, having means for adjusting the holding means to change the loft angle of the club head face relative to the plane of said support plate.

4. Apparatus as defined in claim 2, having means for adjusting the holding means to change the loft angle of the club head face relative to the plane of said support plate.

5. Apparatus as defined in claim 1, having means for rotatably adjusting the holding means in the plane of said radius arm to vary the angle between the cutter means and the hitting face resulting in a closed or open face on the club head.

6. Apparatus as defined in claim 2, having means for rotatably adjusting the holding means in the plane of said radius arm to vary the angle between the cutter means and the hitting face resulting in a closed or open face on the club head.

7. Apparatus as defined in claim 3, having means for rotatably adjusting the holding means in the plane of said radius arm to vary the angle between the cutter means and the hitting face resulting in a closed or open face on the club head.

8. Apparatus as defined in claim 4, having means for rotatably adjusting the holding means in the plane of said radius arm to vary the angle between the cutter means and the hitting face resulting in a closed or open face on the club head.

* * * * *